Patented June 20, 1944

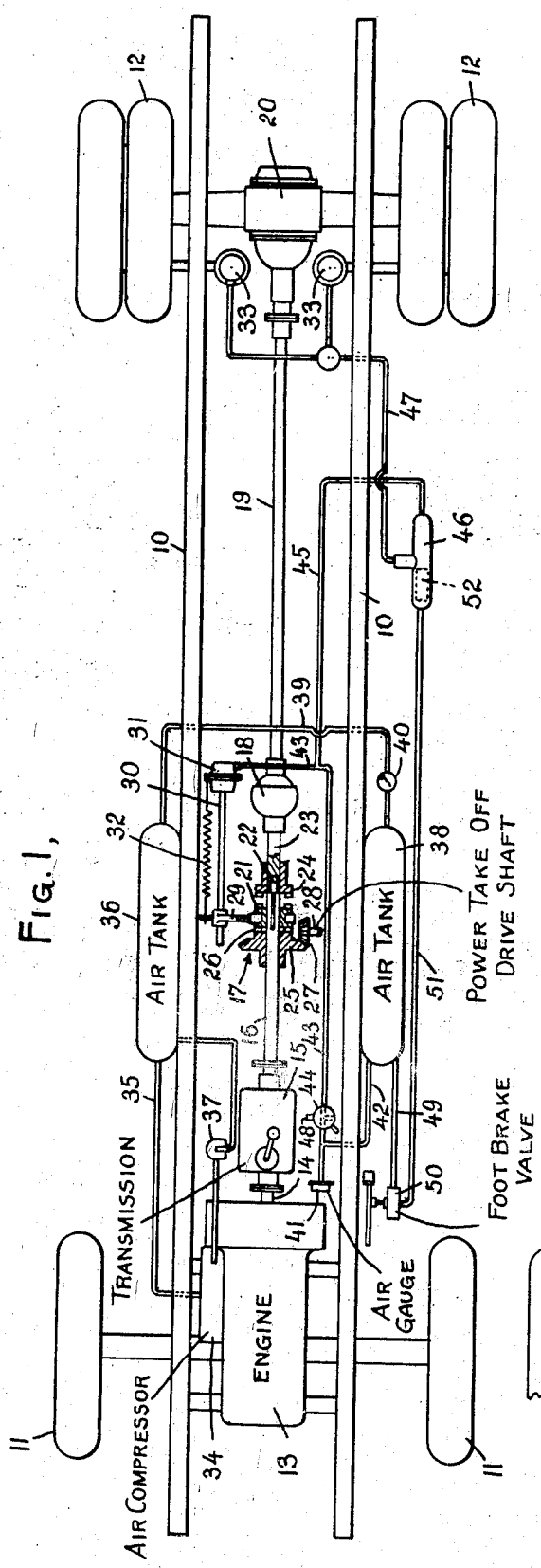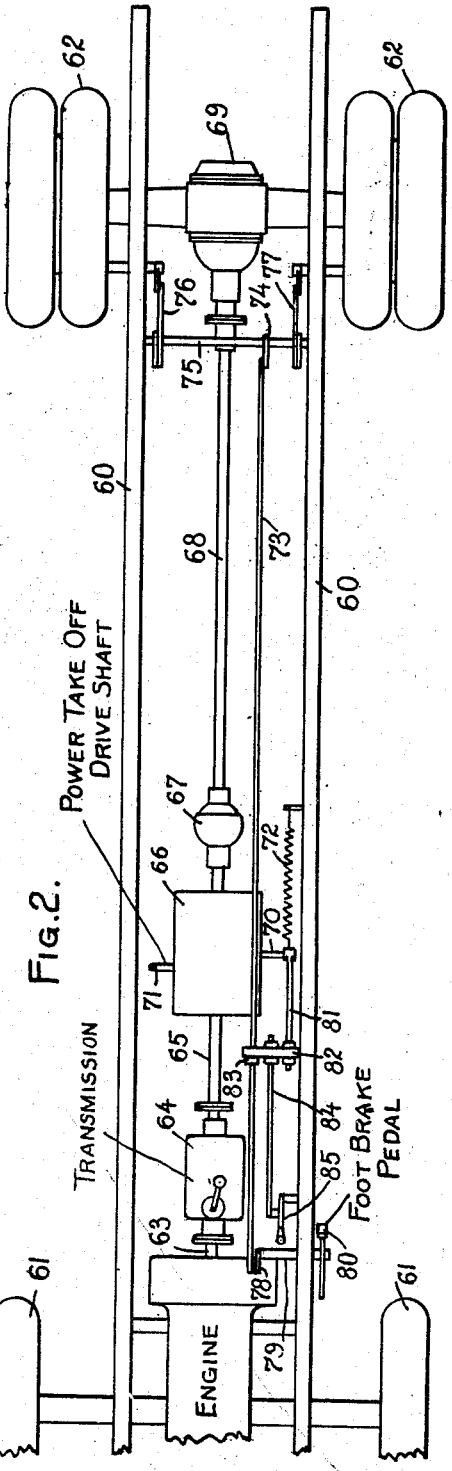

2,351,646

UNITED STATES PATENT OFFICE 2,351,646

POWER TAKE-OFF MECHANISM

Horace Russ Van Vleck, Upper Montclair, N. J.

Application July 9, 1942, Serial No. 450,247

16 Claims. (Cl. 303—6)

This invention relates to power take-off mechanisms, and more particularly to mechanisms by means of which the power of a vehicle engine may be tapped for purposes other than to drive the vehicle wheels. The invention is particularly concerned with the provision of an improved power take-off operating mechanism designed to assure maximum safety in the operation of the power take-off on a truck or other vehicle.

Vehicles such, for example, as oil or other liquid-carrying trucks are advantageously provided with a power take-off mechanism by means of which the power of the engine may be used to drive pumps for delivery of the oil or other liquid, or for operating other mechanism with which the vehicle is equipped. The power take-off mechanism advantageously is connected to the drive shaft of the engine, between the engine drive shaft and the propeller shaft leading to the differential gearing. A power take-off so connected is described in my copending application Serial No. 399,625, filed June 25, 1941.

The power take-off described in my said application is of such construction that it may set in operation only when the vehicle wheels are disconnected from the engine, thus avoiding the possibility of driving the vehicle while the power take-off is being used to operate oil-delivery pumps or other vehicle mechanism. However, it not infrequently happens that the vehicle operator must leave the vehicle while the power take-off is in operation. When left unattended, there is the possibility that the vehicle might by itself roll downhill from the place where it is parked, especially if the vehicle parking brakes are not properly set, or if they are mischievously released.

The present invention provides an improved power take-off operating mechanism so designed that when it is actuated to set the power take-off in operation, it coincidentally sets the vehicle brakes. The mechanism of the invention thus adds to the safety with which the power take-off may be used. Briefly stated, the invention provides in a vehicle having an engine, driving wheels, a power take-off, means for selectively coupling the engine with either the power take-off or the driving wheels, brakes for the wheels, and means for setting the brakes, the improvement which comprises interconnecting said selective coupling means and said brake-setting means in such manner that the brake-setting means are necessarily actuated to set the brakes whenever the selective coupling means are in position to couple the engine to the power take-off.

The invention may be applied to a vehicle equipped with either mechanically operated or compressed air-operated brake-setting means and with correspondingly operated actuating means for the selective coupling means. In a vehicle in which compressed air operates both the brakes and the power take-off, the power take-off actuating means and the brake-setting means are connected (for example, by an air line through which compressed air passes to both the actuating means and the brake-setting means) in such manner that whenever compressed air is supplied to the actuating means to actuate the selective coupling means and thereby connect the engine and the power take-off, compressed air is also supplied to the brake-setting means to set the brakes. A convenient arrangement involves the provision of an air line connecting the vehicle's source of compressed air with the operating mechanism for actuating the selective coupling means, and a second air line connecting the first air line to the brake-setting means.

In an advantageous embodiment of the invention in a vehicle equipped with air brakes, an air line connects the source of compressed air with the mechanism for actuating the selective coupling means, and a second air line, in which a double-action check valve is interposed, connects the first air line with the brake-setting means. A brake control valve connected to the compressed air source may then be connected by a third air line to the double-action check valve, so that compressed air may be admitted to the brake-setting means through the control valve and the check valve without being admitted to the selective coupling actuating device, and compressed air may be admitted through the first air line to the actuating mechanism for the selective coupling and to the brake-setting means without escaping through the brake control valve. A three-way valve having a vent to the atmosphere may be interposed in the first air line, so that when the valve is open, compressed air passes to both the actuating mechanism for the selective coupling means and to the brake-setting means, and when the valve is closed, compressed air is allowed to escape through the vent from both the actuating mechanism and from the brake-setting means.

In the case of a vehicle having mechanically operated actuating means for the power take-off and brakes operated mechanically (by means of a brake rod, for example), the actuating means is mechanically connected by a suitable rod to the brake rod, the connection being made in such manner that whenever the actuating means is operated through said connecting rod to actuate the selective coupling means and thereby connect the engine to the power take-off, the brake rod or other brake-setting means is also operated to set the brakes. In a vehicle of this character the actuating means for the power take-off and the brake rod may be interconnected by an equalizer rod. The equalizer rod, for example, may be connected at one end to the actuating means and at the other end to the brake rod. A shift rod may then be connected to the central portion of the equalizer rod so that whenever the shift rod is operated to move the equalizer rod in a direction to actuate the power take-off, the brake rod simultaneously is moved in a direction to set the brakes.

The invention will be better understood from the following detailed description of advantageous embodiments, considered in conjunction with the accompanying drawing, in which Fig. 1 is a diagrammatic plan of the chassis of a vehicle equipped with a power take-off and compressed air-operated actuating means therefor in accordance with the invention; and Fig. 2 is a diagrammatic plan of the chassis of a vehicle equipped according to the invention with mechanically operated power take-off and brakes.

Referring first to the embodiment of the invention shown in Fig. 1, the vehicle chassis comprises the usual frame members 10 supported by front wheels 11 and rear wheels 12. An engine 13 is mounted at the front of the frame. The engine drive shaft 14 connects with the usual transmission gearing 15, and the drive shaft 16 from the transmission extends rearwardly to the power take-off, indicated generally at 17. Rearwardly of the power take-off is the usual universal coupling 18 which is connected by the usual propeller shaft 19 to the rear wheel differential 20, through which the rear wheels 12 are driven.

The power take-off as shown in the drawing comprises a toothed clutch member 21 splined on the drive shaft 16 so that it will rotate therewith but is slidable therealong. Clutch teeth are formed on both side faces of this clutch member.

The rear end 22 of the transmission drive shaft 16 is of reduced diameter and is journaled in a corresponding recess in the adjacent end of a short drive shaft 23 connected to the universal coupling 18. A toothed clutch member 24 is securely fastened to the end of the shaft 23 adjacent the reduced end 22 of the drive shaft 16.

A bevel gear 25 is journaled on the shaft 16 so as to be rotatable thereabout, but is held in a suitable housing to prevent it from sliding therealong. The bevel gear 25 is formed with a toothed clutch portion 26 facing toward the clutch members 21 and 24. A bevel pinion 27 engaging with the bevel gear 25 is connected to a power take-off shaft 28, by means of which auxiliary equipment (pumps or the like) may be driven.

A clutch fork 29 engages the clutch member 21. By pulling the fork to the rear, the clutch member 21 engages the corresponding toothed clutch member 24 on the shaft 23, and thereby the engine is connected to the rear wheels through the universal coupling 18, the propeller shaft 19, and the differential 20. When the fork is pushed forward, the clutch member 21 is caused to slide along the splines of the shaft 16, disengaging it from the clutch member 24 and causing it to engage with the toothed clutch member formed on the bevel gear 17, whereby the engine is disengaged from the rear driving wheels and is connected through the bevel gear 25 and pinion 27 to the power take-off shaft 28. It will be noted that through this mechanism the engine may be connected selectively either to the rear wheels or to the power take-off shaft, but not to both at the same time.

The fork 29 is operated to slide the clutch member 21 forward along the shaft 16 into engagement with the clutch member 26 on the bevel gear by means of a shaft 30 connected to a diaphragm in a compressed air chamber 31. When compressed air is admitted to the chamber 31, the shaft 30 is pushed forwardly to move the fork 29 and the clutch 21 into engagement with the bevel gear clutch 26. The fork 29 and clutch member 21 are retracted or drawn to the rear, so that the clutch member 21 engages the corresponding clutch member 24, by means of a spring 32 whenever the compressed air is released from the chamber 31. The above-described apparatus is such that whenever compressed air under sufficient pressure is admitted to the chamber 31, the engine is connected to the power take-off shaft, and when the compressed air is released from the chamber 31, the engine may be connected to the rear driving wheels.

The vehicle chassis shown in Figure 1 is equipped with brakes which are set by supplying compressed air to compressed air chambers 33. (Only two compressed air chambers 33 for actuating rear wheel brakes are shown in the drawing, but it is apparent that any desired number of brakes and air chambers therefor may be provided.) The compressed air for operating the brakes and the power take-off clutch 21 is derived from a compressor 34. The compressor delivers compressed air through an air line 35 to a tank 36. A governor 37 connected between the tank and the compressor serves to maintain the air pressure in the tank 36 substantially constant. Compressed air from the tank 36 passes to a second tank 38 through an air line 39 and check valve 40.

The pressure of the compressed air in the tank 38 is indicated by an air pressure gauge 41 connected to the tank by an air line 42. An air line 43 is connected through a three-way valve cock 44 to the air line 42, and this air line serves to convey compressed air from the tank 38 to the air chamber 31 for actuating the power take-off. Connected to the air line 43 is an air line 45 leading to a double-action check valve 46. An air line 47 leads from the double-action check valve to the air chambers 33 by means of which the vehicle brakes are set.

The above-described arrangement of air lines is such that whenever the valve 44 is open to admit compressed air from the air tank 38 through the air line 43 to the air chamber 31 for actuating the power take-off, compressed air also flows through the air line 45 to the check valve 46 and therethrough to the air chambers 33, causing the vehicle brakes to be set. Thus, whenever the power take-off is set in operation, the vehicle brakes are ordinarily set, and the vehicle is unable to roll accidentally from the place where it is parked during use of the power take-off.

The valve 44 is provided with a vent 48, so that when the valve is turned to the off-position, shutting off the passage of air from the air tank 38 into the air line 43, the air line 43 is vented to the atmosphere and the air pressure in the air chambers 31 and 33 drops substantially to atmospheric pressure. The power take-off is thereby disengaged by action of the spring 32, and at the same time the vehicle brakes are released.

For normal operation of the vehicle brakes, an air line 49 connects the air tank 38 with the usual foot-pedal-operated brake-control valve 50. An air line 51 connects the brake-control valve with the double-action check valve 46. This check valve contains a floating plug 52 which may slide to either end of the valve body, shutting off the connection made to the valve body at that end. However, the plug 52 does not shut off the connection of the air line 47 made to the central portion of the valve body.

When the valve cock 44 is in the off-position and the brake-control valve 50 is open, compressed air passing through the air line 51 forces the plug 52 to the end of the check valve body at which the air line 45 is connected. The air line 45 is thus blocked off, and a free passage is provided for compressed air from the air line 50 through the check valve and through the air line 47 to the brake actuating air chambers 33. Thus with the valve cock 44 closed, the brake may be operated in the usual manner by manipulation of the foot-control valve 50. When the vehicle is parked and the valve cock 44 is open in order to engage the power take-off, compressed air passing through the air line 45 forces the plug 52 in the double-action check valve to the end at which the air line 51 is connected, thereby blocking off this air line. Free passage of air from the air line 45 is thus provided through the check valve to the air line 47, while escape of the compressed air through the air line 51 to the brake-control valve vent is prevented.

If desired, the valve cock 44 may be provided with a padlock or other form of key-operated lock so that it may be securely locked in the position effecting operation of the power take-off drive shaft and setting of the vehicle brakes, or in the position effecting disengagement of the power take-off. Provision of such a lock prevents unauthorized tampering with the power take-off control means when the vehicle operator is away from the vehicle. It is particularly desirable to make such provision to prevent mischievous disengagement of the power take-off and release of the brakes when the operator is temporarily absent from the vehicle.

The particular arrangement of air lines described above for actuating both the power take-off and the vehicle brakes by means of compressed air is particularly advantageous for large trucks equipped with air brakes, but it is apparent that various modifications may be made without departing from the principle of the invention.

Referring now to Fig. 2 of the drawing, the invention is shown embodied in the chassis of a vehicle equipped with mechanically operated brakes. The vehicle chassis shown in Fig. 2 comprises frame members 60 supported on front wheels 61 and rear wheels 62. The vehicle engine is connected by its drive shaft 63 to a conventional transmission 64, and the drive shaft 65 from the transmission extends rearwardly through the power take-off mechanism 66 to the universal coupling 67. A propeller shaft 68 connects the universal coupling with the rear wheel differential 69, through which the rear wheels 62 are driven. The power take-off 66 may be constructed in the same manner shown in Fig. 1 and described above.

The arm 70 of a shifting fork projects from the power take-off housing. (In Fig. 2 the fork arm is shown projecting to the left of the power take-off housing, rather than to the right as in Fig. 1.) By moving the shifting fork arm 70 forward with respect to the vehicle, the engine may be connected to a power take-off drive shaft 71 (shown projecting from the right rather than from the left of the power take-off housing), and by moving the shifting fork arm 70 rearwardly, the power take-off is disconnected and the engine may be connected to the rear driving wheels. A spring 72 connected to the end of the fork arm 70 and to a frame member normally urges the fork arm 70 to the rearward position in which the power take-off is disconnected from the engine and the rear wheels may be connected thereto.

A brake rod 73 is provided for operating the brakes with which the rear wheels are provided. The brake rod 73 is connected to a crank 74 on a shaft 75, which in turn is connected by suitable linkage 76, 77 to the rear wheel brakes. By pulling the brake rod 73 forward with respect to the vehicle, the brakes are set. Although only the rear wheels are shown in Fig. 2 as equipped with brakes, it is of course apparent that brakes may also be provided on the front wheels 61.

The brake rod 73 is connected at its forward end to a crank 78 on a shaft 79 carrying the brake pedal 80. When the brake pedal is pressed forward, the crank 78 is turned in a direction to pull forward on the brake rod 73 and set the vehicle brakes.

A shift rod 81 is connected at one end to the fork arm 70 of the power take-off and at the other end to one end of an equalizing rod 82. The other end of the equalizing rod 82 is formed with an opening through which the brake rod 73 extends. A collar 83 is secured to the brake rod closely adjacent the equalizing rod 82 on the side thereof toward which the brake rod must be moved to set the vehicle brakes. The equalizing rod 82 thus provides a mechanical connection between the shift rod 81 of the power take-off and the brake rod 73.

A shift rod 84 is connected at one end to the central portion of the equalizing rod 82 and at the other end to a lever 85 located where it is readily accessible to the vehicle operator. When the lever 85 is pushed forward with respect to the vehicle, the shift rod 84 and the equalizing rod 82 are drawn forward. The equalizing rod pulls with it the shift rod 81 connected to the power take-off fork arm 70, thus connecting the power take-off drive shaft 71 through the power take-off 66 with the vehicle engine; and at the same time, the equalizing rod 82 pulls forward on the brake rod 73, setting the vehicle brakes. The equalizing rod may pivot slightly at the midpoint where the shift rod 84 is connected, so as to insure proper distribution between the fork arm 70 and the brake rod 73 of the force applied through the lever 85. When the lever 85 is released, the spring 72 draws the fork arm 70 rearwardly, thus disconnecting the power take-off drive shaft from the engine and connecting the transmission drive shaft to the universal coupling. The shift rod 81 and the equalizing rod 82 are at the same time drawn rearwardly by the action of the spring 72, so that the vehicle brakes may be released.

When the lever 85 for effecting operation of the power take-off is released and the equalizing rod 82 is thereby brought to its rearward position by the action of the spring 72, the brake rod 73 is free to be operated by the foot-pedal 80, either to set or to release the vehicle brakes. This is owing to the fact that the brake rod 73 passes freely through the opening in the end of the equalizing rod 82. The collar 83, which is secured only to the brake rod, insures that the brake rod is drawn forward to its brake-setting position whenever the equalizing rod is drawn forward, but when the equalizing rod is in its rearward position, the collar 83 does not impede forward or rearward movement of the brake rod 73 to the extent necessary to set or release the vehicle brakes.

As in the case of the apparatus described above in connection with Fig. 1, the control lever 85 may be arranged to receive a padlock or other form of key-operated lock so that it may be locked in either its forward position (in which the power take-off is engaged and vehicle brakes are set) or in its rearward position.

Although a particular arrangement of levers and rods for mechanically interconnecting the power take-off actuating means and the mechanical brake-setting means is shown in Fig. 2 and specifically described herein, it is understood that other forms of such interconnection may be provided without departing from the principle of the invention.

The herein described arrangements for operating the power take-off and simultaneously setting the vehicle brakes are such as to increase materially the safety with which the power take-off may be used, for with the brakes set there is little opportunity for the vehicle to be set in motion, either accidentally or mischievously. The vehicle operator may therefore absent himself from the immediate vicinity of the vehicle (as his duties may require) without fear that in his absence the vehicle will be set in motion.

I claim:

1. In a vehicle having an engine, driving wheels, a power take-off, means for selectively coupling the engine with either the power take-off or the driving wheels, brakes for the wheels, and means for setting the brakes, the improvement which comprises interconnecting means associated with said selective coupling means and said brake-setting means, and actuating means associated with the interconnecting means adapted to actuate the brake-setting means to set the brakes whenever the selective coupling means are in position to couple the engine to the power take-off.

2. In a vehicle of the character described having a power take-off, actuating means therefor, brakes, and brake-setting means, the improvement which comprises interconnecting means associated with the power take-off actuating means and the brake-setting means, and actuating means associated with the interconnecting means adapted to actuate said power take-off actuating means when thrown into position to cause actuation of the power take-off whereby the brake-setting means are coincidentally actuated to set the brakes.

3. In a vehicle having an engine, driving wheels, a power take-off, means for selectively coupling the engine with either the power take-off or the driving wheels, compressed air-operating actuating means for said selective coupling means, brakes for the wheels, and compressed air-operated brake-setting means, the improvement which comprises interconnecting means associated with said compressed air-operated actuating means and said brake-setting means, and actuating means associated with the interconnecting means adapted to actuate said compressed air actuating means to actuate the selective coupling means when compressed air is supplied to the compressed air-operated actuating means to connect the engine and the power take-off whereby compressed air is also supplied to the brake-setting means to set the brakes.

4. In a vehicle of the character described having a power take-off, compressed air-operated actuating means therefor, brakes, and compressed air-operated brake-setting means, the improvement which comprises interconnecting means associated with said compressed air-operated actuating means and said brake-setting means, and actuating means associated with the interconnecting means adapted to actuate said compressed air-operated actuating means to effect operation of the power take-off when compressed air is supplied to said compressed air-operated actuating means whereby compressed air is also supplied to the brake-setting means to set the brakes.

5. In a vehicle having an engine, driving wheels, a power take-off, means for selectively coupling the engine with either the driving wheels or the power take-off, and brakes for the wheels, a compressed air-actuated device for operating said selective coupling means, compressed air-operated brake-setting means, an air line for supplying compressed air to said device for operating the selective coupling means to couple the engine to the power take-off, and a second air line connected to said first air line and to the brake-setting means through which compressed air is supplied for operating the brake-setting means whenever compressed air is admitted to said first air line.

6. In a vehicle having an engine, driving wheels, a power take-off, coupling means for selectively coupling the engine either to the driving wheels or to the power take-off, a compressed air-operated device for actuating said coupling means to couple the engine to the power take-off, brakes for the wheels, compressed air-actuated brake-setting means, and a source of compressed air, an air line connecting said compressed air source with said device for actuating the selective coupling means, and a second air line connecting said first air line to the brake-setting means.

7. In a vehicle having an engine, driving wheels, a power take-off, coupling means for selectively coupling the engine either to the driving wheels or to the power take-off, a compressed air-operated device for actuating said coupling means to couple the engine to the power take-off, brakes for the wheels, compressed air-actuated brake-setting means, and a source of compressed air, an air line connecting said compressed air source with said device for actuating the selective coupling means, a second air line connecting said first air line to the brake-setting means, a double-action check valve interposed in said second line, a brake control valve connected to the compressed air source, and a third air line connecting said control valve to said double-action check valve, whereby compressed air may be admitted to the brake-setting means through the control valve and check valve without being admitted to the selective coupling actuating device, and compressed air may be admitted through the first air line to the selective coupling actuating device and to the brake-setting means without escaping through the brake control valve.

8. In a vehicle of the character described a power take-off, compressed air-operated actuating means therefor, brakes, compressed air-operated brake-setting means, and a source of compressed air, an air line connecting said source of compressed air, an air line connecting said source of compressed air with said actuating means, a second air line connecting said first air line with said brake-setting means, and a valve in said first air line between the source of compressed air and the point of connection of said second air line, whereby when the valve is opened compressed air is admitted to both the actuating means and the brake-setting means.

9. In a vehicle of the character described, a power take-off, compressed air-operated actuating means therefor, brakes, compressed air-operated brake-setting means, and a source of compressed air, an air line connecting said source of compressed air with said actuating means, a second air line connecting said first air line with said brake-setting means, and a three-way valve connected in said first air line between the source of compressed air and the point of connection of said second air line and having a vent to the atmosphere, whereby when the valve is opened compressed air is admitted to both the actuating means and the brake-setting means, and when the valve is closed compressed air is allowed to escape through the vent from both said actuating means and said brake-setting means.

10. In a vehicle of the character described, a power take-off, compressed air-operated actuating means therefor, brakes, compressed air-operated brake-setting means, and a source of compressed air, a brake control valve connected to said source of compressed air, a double-action check valve, an air line connecting said control valve with said check valve, a second air line connecting said check valve with said brake-setting means, a third air line connecting said actuating means and the source of compressed air, and a fourth air line connecting said third air line to the check valve, whereby compressed air may be admitted through the control valve and check valve to the brake-setting means without passing to the actuating means, but compressed air admitted through the third air line to the actuating means may pass through the check valve to the brake-setting means without escaping to the control valve.

11. In a vehicle of the character described, a power take-off, compressed air-operated actuating means therefor, brakes, compressed air-operated brake-setting means, and a source of compressed air, a brake control valve connected to said source of compressed air, a double-action check valve, an air line connecting said control valve with said check valve, a second air line connecting said check valve with said brake-setting means, a third air line connecting said actuating means and the source of compressed air, a valve in said third air line, and a fourth air line connecting said third air line at a point on the actuating means side of the valve therein to the check valve, whereby compressed air may be admitted through the control valve and check valve to the brake-setting means without passing to the actuating means, and upon opening the valve in said third air line compressed air may pass therethrough to the actuating means and through the check valve to the brake-setting means without escaping to the control valve.

12. In a vehicle having an engine, driving wheels, a power take-off, means for selectively coupling the engine with either the power take-off or the driving wheels, mechanically operated means for actuating said selective coupling means, brakes for the wheels, and mechanically operated brake-setting means, the improvement which comprises mechanically interconnecting means associated with said mechanically operated actuating means and said brake-setting means, and actuating means associated with the mechanically interconnecting means adapted to actuate the mechanically operated actuating means to actuate the selective coupling means and thereby connect the engine to the power take-off and operate the brake-setting means to set the brakes.

13. In a vehicle of the character described having a power take-off, mechanically operated actuating means therefor, brakes, and mechanically operated brake-setting means, the improvement which comprises mechanically interconnecting means associated with said actuating means and said brake-setting means, and actuating means associated with the mechanically interconnecting means adapted to actuate the mechanically operated actuating means to effect operation of the power take-off and operate the brake-setting means to set the brakes.

14. In a vehicle of the character described having a power take-off, actuating means therefor, brakes and a brake rod for setting said brakes, the improvement comprising a rod interconnecting the actuating means and the brake rod, a shift rod connected to said interconnecting rod, and actuating means associated with said interconnecting rod adapted to operate said connecting rod and thereby to actuate said power take-off and simultaneously to operate the brake rod to set the brakes.

15. In a vehicle of the character described having a power take-off, actuating means therefor, brakes, and a brake rod for setting the brakes, the improvement comprising an equalizer rod connected at one end to said actuating means and at the other end to said brake rod, and a shift rod connected to the central portion of said equalizer rod, whereby whenever said shift rod is moved in a direction to actuate the power take-off through the connection provided by the equalizer rod, the brake rod simultaneously is operated in a direction to set the brakes.

16. In a vehicle of the character described having a power take-off, actuating means therefor, brakes, and a brake rod for setting the brakes, the improvement comprising an equalizer rod connected at one end to said actuating means and having at its other end an opening through which the brake rod extends, a collar secured to said brake rod closely adjacent said equalizer rod on the side thereof toward which the brake rod must be moved to set the brakes, and a shift rod connected to the central portion of said equalizer rod, whereby when the shift rod is operated to exert a force on the equalizing rod in the direction of the collar secured to the brake rod the power take-off is engaged and simultaneously the brakes are set, and when the shift rod is released the brake rod may be operated independently of the equalizing rod to set the brakes.

HORACE RUSS VAN VLECK.